US012591575B2

(12) United States Patent
Hall et al.

(10) Patent No.: US 12,591,575 B2
(45) Date of Patent: Mar. 31, 2026

(54) IDENTIFICATION OF FEATURE GROUPS IN FEATURE GRAPH DATABASES

(71) Applicant: AT&T Intellectual Property I, L.P., Atlanta, GA (US)

(72) Inventors: Elijah Hall, Plano, TX (US); Edmond J. Abrahamian, Richmond Heights, MO (US); Ana Armenta, San Jose, CA (US); Andrew Campbell, Pleasant Hill, CA (US); Jean Luo, Millbrae, CA (US); Prince Paulraj, Coppell, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 26 days.

(21) Appl. No.: 17/959,520

(22) Filed: Oct. 4, 2022

(65) Prior Publication Data

US 2024/0111771 A1    Apr. 4, 2024

(51) Int. Cl.
*G06F 16/2455* (2019.01)
*G06F 16/28* (2019.01)

(52) U.S. Cl.
CPC ........ *G06F 16/2455* (2019.01); *G06F 16/283* (2019.01)

(58) Field of Classification Search
CPC ........................... G06F 16/2455; G06F 16/283
USPC ........................................................ 707/769
See application file for complete search history.

(56) References Cited

U.S. PATENT DOCUMENTS

| | | | | |
|---|---|---|---|---|
| 7,174,164 B1 * | 2/2007 | Knoop | ................... | H04M 3/42 |
| | | | | 455/414.1 |
| 10,210,280 B2 * | 2/2019 | Verma | ................. | G06F 16/9024 |
| 2016/0055184 A1 * | 2/2016 | Fokoue-Nkoutche | ...................... | |
| | | | | G06F 16/213 |
| | | | | 707/809 |
| 2016/0065597 A1 * | 3/2016 | Nguyen | .............. | H04L 63/1441 |
| | | | | 726/22 |
| 2016/0117414 A1 * | 4/2016 | Verma | .................... | G06F 16/22 |
| | | | | 707/798 |
| 2021/0124780 A1 * | 4/2021 | Silva | ....................... | G06F 18/29 |

(Continued)

OTHER PUBLICATIONS

Riskspan, "Making Data Dictionaries Beautiful Using Graph Databases", Jun. 18, 2018, downloaded from https://riskspan.com/graphs-for-data-management/, 7 pages.

(Continued)

*Primary Examiner* — Kimberly L Wilson

(57) ABSTRACT

A processing system may apply a community detection process to a feature graph database to identify a plurality of communities of features, the feature graph database comprising: a plurality of objects, each associated with one of a feature or a concept, and a plurality of relationships between the plurality of objects. Next, the processing system may label a first plurality of features of the feature graph database with at least a first community label, where the first plurality of features comprises features of at least a first community of the plurality of communities. The processing system may then obtain a search associated with at least one feature of the feature graph database, where the at least one feature is a part of the at least the first plurality of features of the at least the first community, and provide the first plurality of features in response to the search.

20 Claims, 6 Drawing Sheets

(56)     References Cited

U.S. PATENT DOCUMENTS

2022/0277315 A1 * 9/2022 Mittal .................. G06F 16/951
2023/0140148 A1 * 5/2023 Dong ............... G06F 16/90335
                                                              707/718

OTHER PUBLICATIONS

Planetary Data System, "Data Dictionary Search", accessed on Aug. 1, 2022 from https://pds.nasa.gov/tools/dd-search/, 4 pages.
Kasenchak B., et al. , "Introduction to Ontology Concepts and Modeling", Content Strategy, Foundational Thinking, Information Architecture, Boxes and Arrows, Nov. 2, 2021, 19 pages.
"Ontology Components", Wikipedia, accessed on Jul. 24, 2022, 6 pages.
Tripathi, A., "Understanding Ontologies and Knowledge Graphs", Mar. 27, 2021, 8 pages.

* cited by examiner

100

FEATURE SET 200
(TO ADD TO FEATURE GRAPH)

| FEATURE SET NAME | FEATURE | CONCEPT | RECIPE | LINEAGE |
|---|---|---|---|---|
| SAMPLE S1 | IMEI | Account | IMEIIsAssignedToAccount; PhoneHasIMEI | |
| SAMPLE S1 | Manufacturer | Product | DeviceIsManufacturedByManufacturer | |
| SAMPLE S1 | Billing AccountNumber | Account | AccountHasBillingAccountNumber | IsRelatedtoBan |
| SAMPLE S1 | Payment Type | Payment | PaymentTransactionHasPaymentType | |
| SAMPLE S1 | Cost | Product; Payment | PhoneHasCost | |
| SAMPLE S1 | State | Credit application | CreditApplicationWasFiledInState | IsDerviedFromAddress |
| ... | ... | ... | | |

CORRECTED FEATURE ONTOLOGY/RECIPE: PhoneHasPrice

CORRECTED LABEL: Price

| FEATURE ID | FEATURE SET NAME | FEATURE NAME | GROUP ID | GROUP NAME | USER LABELS |
|---|---|---|---|---|---|
| 1 | A | AppID | 1 | ApplicationID | |
| 2 | A | IMEI | 2 | IMEI | |
| 3 | A | BAN | 3 | BAN | |
| 4 | B | BAN | 3 | BAN | |
| 5 | B | EquipmentID | 2 | IMEI | |
| 6 | B | CTN | 4 | CTN | |
| 7 | B | Usage_calls | 5 | Usage_calls_1day | |
| 8 | C | CTN | 4 | CTN | |
| 9 | C | Usage_calls | 6 | Usage_calls_30day | |
| 10 | C | Contacts_count | 7 | Contacts_count | |
| 11 | D | wirelessBan | 3 | BAN | |
| 12 | D | AID | 1 | ApplicationID | |
| 13 | E | BillingAccountNumber | 3 | BAN | |
| 14 | E | ApplicationID | 1 | ApplicationID | |

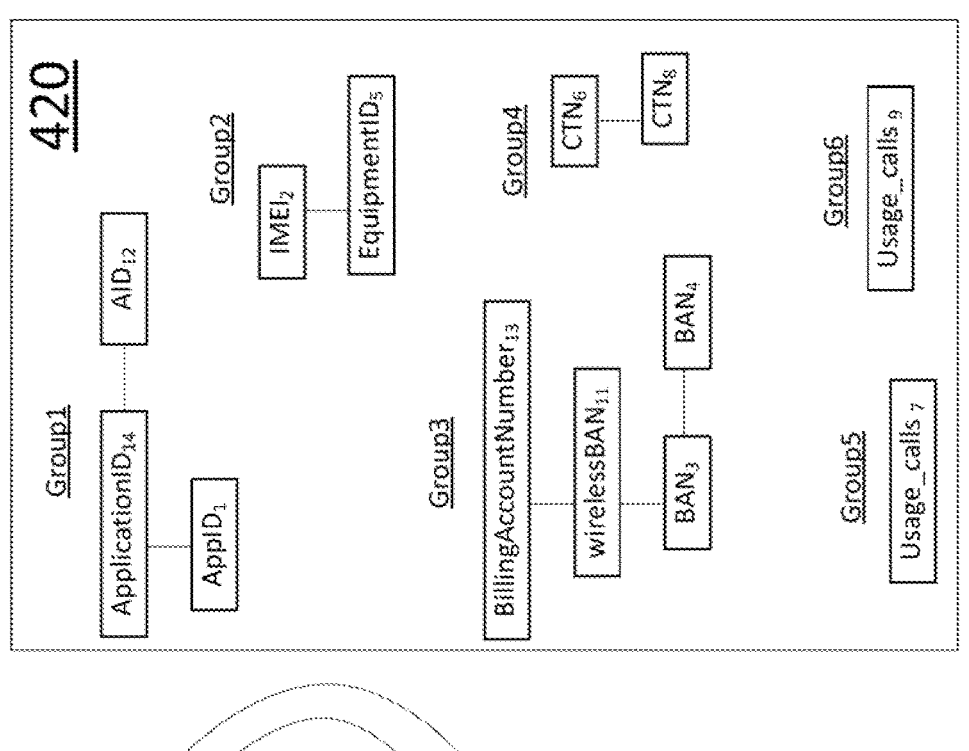

420

Group1
ApplicationID₁₄ — AID₁₂
AppID₁

Group2
IMEI₂ — EquipmentID₅

Group3
BillingAccountNumber₁₃ — wirelessBAN₁₁ — BAN₃ — BAN₄

Group4
CTN₆ — CTN₈

Group5
Usage_calls₇

Group6
Usage_calls₉

Figure 5:
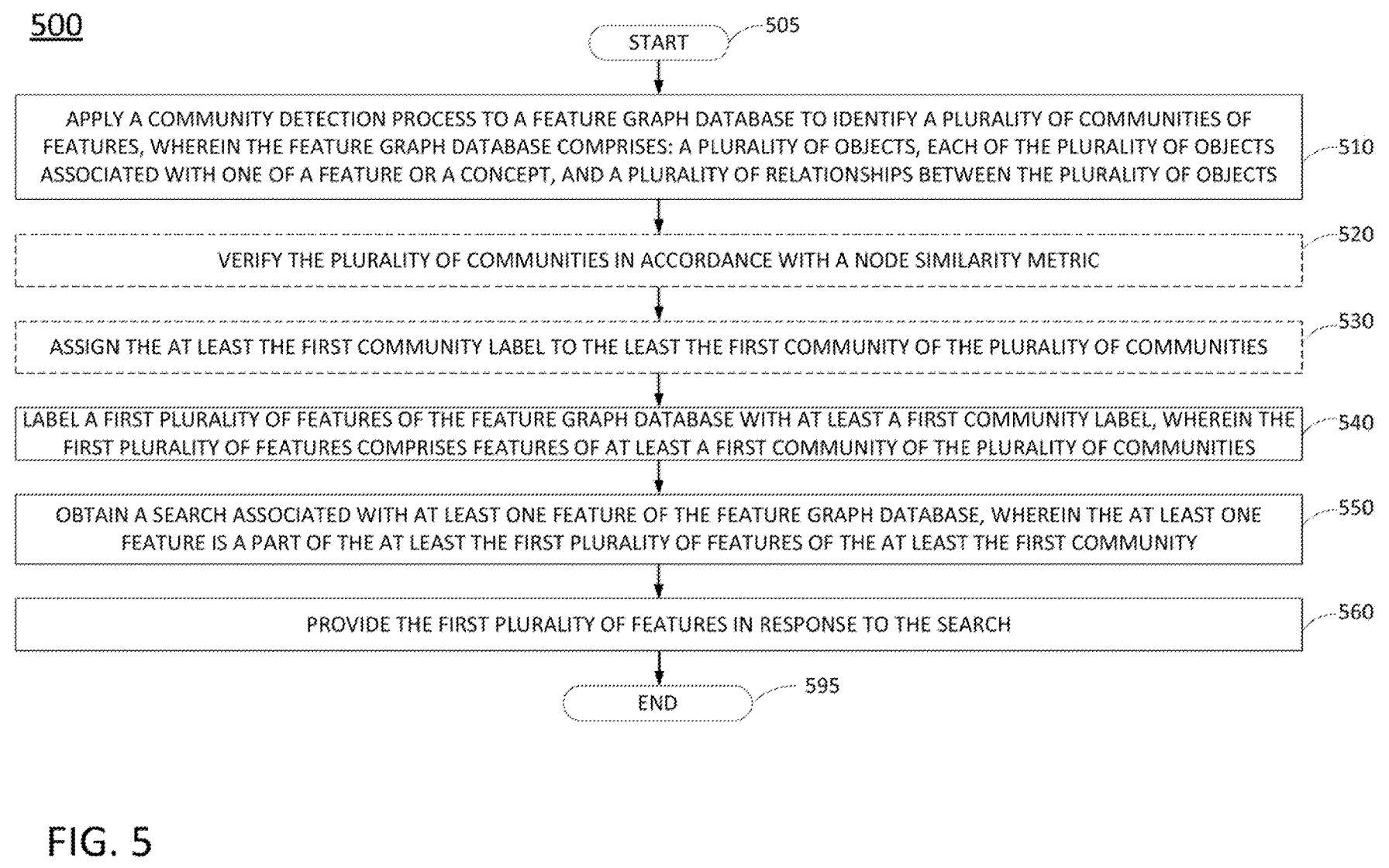

START 505

APPLY A COMMUNITY DETECTION PROCESS TO A FEATURE GRAPH DATABASE TO IDENTIFY A PLURALITY OF COMMUNITIES OF FEATURES, WHEREIN THE FEATURE GRAPH DATABASE COMPRISES: A PLURALITY OF OBJECTS, EACH OF THE PLURALITY OF OBJECTS ASSOCIATED WITH ONE OF A FEATURE OR A CONCEPT, AND A PLURALITY OF RELATIONSHIPS BETWEEN THE PLURALITY OF OBJECTS — 510

VERIFY THE PLURALITY OF COMMUNITIES IN ACCORDANCE WITH A NODE SIMILARITY METRIC — 520

ASSIGN THE AT LEAST THE FIRST COMMUNITY LABEL TO THE LEAST THE FIRST COMMUNITY OF THE PLURALITY OF COMMUNITIES — 530

LABEL A FIRST PLURALITY OF FEATURES OF THE FEATURE GRAPH DATABASE WITH AT LEAST A FIRST COMMUNITY LABEL, WHEREIN THE FIRST PLURALITY OF FEATURES COMPRISES FEATURES OF AT LEAST A FIRST COMMUNITY OF THE PLURALITY OF COMMUNITIES — 540

OBTAIN A SEARCH ASSOCIATED WITH AT LEAST ONE FEATURE OF THE FEATURE GRAPH DATABASE, WHEREIN THE AT LEAST ONE FEATURE IS A PART OF THE AT LEAST THE FIRST PLURALITY OF FEATURES OF THE AT LEAST THE FIRST COMMUNITY — 550

PROVIDE THE FIRST PLURALITY OF FEATURES IN RESPONSE TO THE SEARCH — 560

END 595

IDENTIFICATION OF FEATURE GROUPS IN FEATURE GRAPH DATABASES

The present disclosure relates generally to telecommunication network database records management and utilization, and more particularly to methods, computer-readable media, and apparatuses for providing search results comprising features of a feature graph database that are labeled with a first community label in response to a search associated with at least one of the features.

BRIEF DESCRIPTION OF THE DRAWINGS

The present disclosure can be readily understood by considering the following detailed description in conjunction with the accompanying drawings, in which:

FIG. 2 illustrates an example of a feature set to be added to a feature store, in accordance with the present disclosure;

FIG. 4 illustrates an example data dictionary and an example of corresponding feature communities, in accordance with the present disclosure;

FIG. 5 illustrates a flowchart of an example method for providing search results comprising features of a feature graph database that are labeled with a first community label in response to a search associated with at least one of the features.

To facilitate understanding, identical reference numerals have been used, where possible, to designate identical elements that are common to the figures.

DETAILED DESCRIPTION

Figure 1:
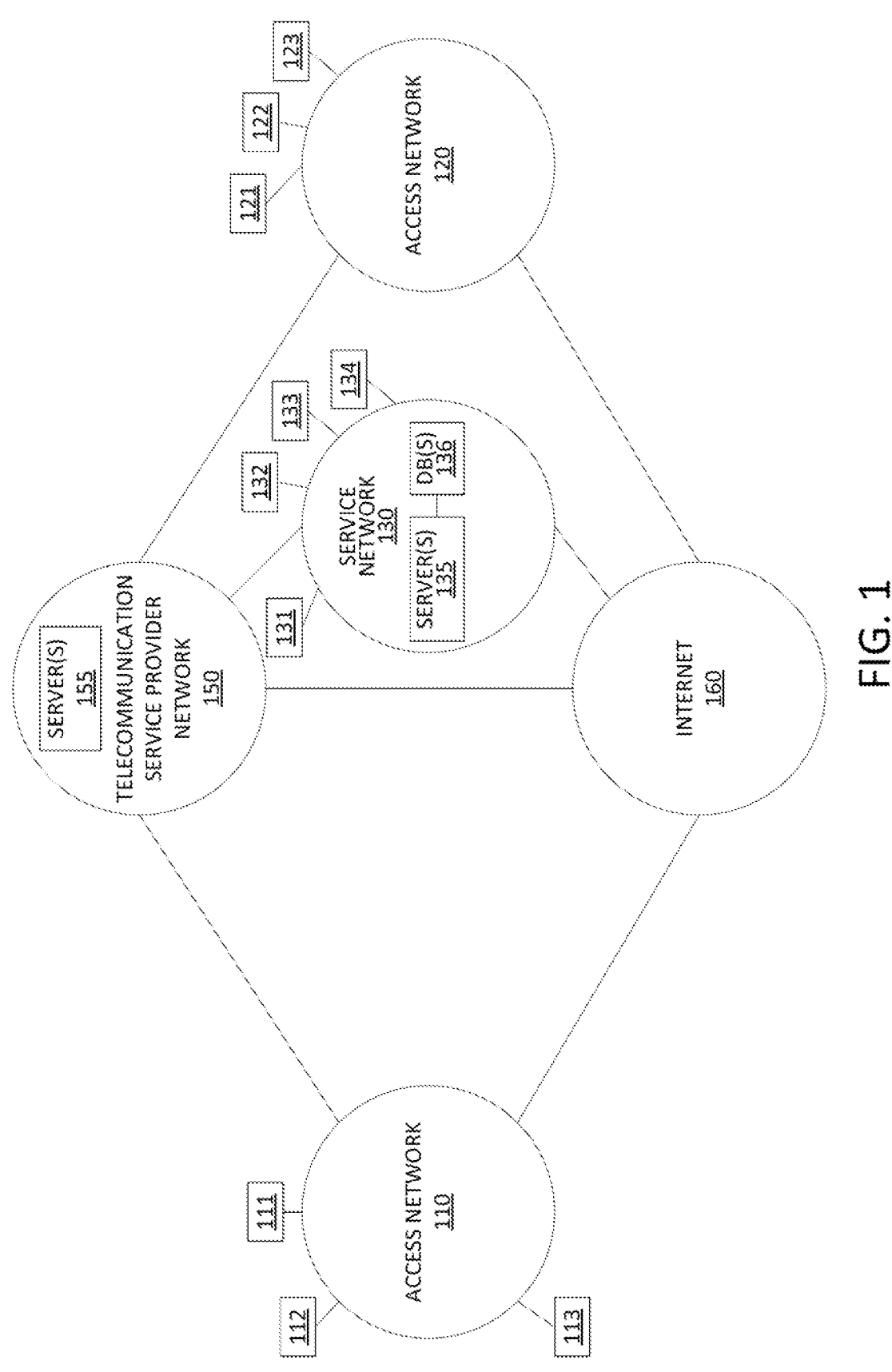
FIG. 1 illustrates one example of a system including a telecommunication network, according to the present disclosure.

The present disclosure broadly discloses methods, non-transitory (i.e., tangible or physical) computer-readable media, and apparatuses for providing search results comprising features of a feature graph database that are labeled with a first community label in response to a search associated with at least one of the features. For instance, in one example, a processing system including at least one processor may apply a community detection process to a feature graph database to identify a plurality of communities of features within the feature graph database, where the feature graph database comprises: a plurality of objects, each of the plurality of objects associated with one of a feature or a concept, and a plurality of relationships between the plurality of objects. Next, the processing system may label a first plurality of features of the feature graph database with at least a first community label, where the first plurality of features comprises features of at least a first community of the plurality of communities. The processing system may then obtain a search associated with at least one feature of the feature graph database, where the at least one feature is a part of the at least the first plurality of features of the at least the first community, and provide the first plurality of features in response to the search.

In accordance with the present disclosure, a feature store may comprise a data storage system, e.g., a "data warehouse," for features (also known as descriptors) that can be used for various purposes, such as for training machine learning models. Increased interest in feature stores stems at least in part from their ability to provide easy access to vast numbers of features to be shared among data scientists, engineers, and architects when orchestrating machine learning flows. However, this same functionality can become unwieldy if features were to be added indiscriminately.

In one example, features may be disambiguated such that duplicate features that differ in name only are not added to a feature store. Alternatively, or in addition, in one example, features that come from the same source(s) and/or that are complementary subsets of data of a same feature may be identified during a feature on-boarding process. In one example, a three-pronged approach may be applied to identify datasets that contain features coming from sources already available in the feature store. First, a user entering a feature into the feature store can declare the lineage of the feature using a lineage service. When lineage information is provided, a lineage trace-back can reveal information about potential duplicates. In one example, the lineage may include feature-to-feature relationships, such as indicating that two features are "related." In one example, feature-to-feature relationships may be more specifically defined, such as indicating that one feature is "derived from" another feature, that one feature and another feature are the same, but segmented/disjoint in some way, such as being temporally disjoint (e.g., data records from different days, different weeks, different months, etc.), containing the same type of data but for different zones (e.g., different states, different network zones, etc.), etc., and so forth.

Second, the feature store may keep track of a complete ontology for features in a feature graph database or "feature graph." For instance, the feature graph database may comprise an "ontology graph" that depicts both lineage and nomenclature. When introducing a new feature, checks are made that it does not fall within an existing ontological entry (otherwise this implies that it is a duplicate). In addition, when features are introduced into the feature store, the features may be associated with time blocks, or time ranges. A fingerprint service may compute a fingerprint for feature data that is in a prescribed time range. For example, fingerprints may include multiple aspects of information about a feature (e.g., a table column), such as high values, low values, mean values, median values, entropy metrics, uniqueness factors, etc. In one example, fingerprints may include feature information computed by a choice of one or more techniques, including but not limited to statistical methods, for example T-tests, Kolmogorov-Smirnov test for numeric types, Tversky index for string types, time series sampling, etc.

In any case, fingerprints for new proposed features can be compared with those already in the feature store to identify potential duplicates. For instance, the comparison may be quantified via calculation of a distance metric (e.g., a similarity and/or different metric) between the fingerprints. For instance, respective fingerprints may be considered vectors from which a cosine distance or the like may be calculated. In one example, a machine learning model may be trained to output a feature similarity value (or feature difference value) based on the respective fingerprints. For instance, a machine learning model may learn weights to apply to difference values between corresponding fingerprint information elements in respective fingerprints (fingerprint vectors) to calculate an overall distance metric (or similarity metric). In one example, the fingerprinting check may work in conjunction with the ontology check, e.g., in parallel or following an ontology check to confirm whether a new feature is or is not a duplicate of an existing feature. In accordance with the present disclosure, a feature graph may include nodes representing features (e.g., "individuals" or "objects") and concepts/classes (and in one example, properties of features), and the edges may represent the relationships between the features, and/or between features and classes (and in one example, between features and the respective feature properties).

Features may be introduced primarily as part of a feature set, which may comprise multiple features that may come from different sources. For instance, a feature may comprise a table column. When a feature set is added, the contributor may not be fully aware of the scope of features of other feature sets. In one example, a feature store may scan the available features and determine which ones are likely to be related based on having the same or similar ontologies. In various examples, the feature store may further identify likely related features (or unrelated features) based on feature names, timestamps, and/or fingerprints. For example, a feature ontology resolution module may work in conjunction with a feature similarity module to more accurately identify likely duplicates (or non-duplicates). In one example, a user may provide feedback based on recommended similar features to validate whether the two features are in fact the same, not the same, derived or otherwise related, and so forth.

It is again noted that in one example, a true duplicate feature may not be entered into the graph database (and thus may not be discoverable via ontological search). However, it may remain part of the source feature set, and hence remain available in the feature store. In another example, a duplicate feature may not be entered as a unique node in the feature graph, but may be indicated as node information for a node representing an existing feature of which the new feature is a duplicate. Alternatively, a duplicate feature may be entered as a new node having a single link to a node for an existing feature of which the new feature is a duplicate. In other words, the duplicate feature is not ontologically entered into the graph database, but is specially entered as a duplicate. Otherwise, new unique features may be added to the graph database in accordance with their respective ontologies, lineage, and/or timing information.

Once in the graph data structure and ingested into a graph computation engine, the present disclosure may apply a community detection process to identify different feature communities. In one example, features may be re-labeled to include community labels of the respective communities and tracked by the feature store to provide a consolidated view into which unique features are available within a feature community and across which data sets. In one example, the community detection may be across feature-to-feature relationships in the feature graph. For instance, the community detection may ignore edges/relationships that are not feature-to-feature (such as feature-to-concept relationships, concept-to-concept relationships, etc.). In one example, the community detection may be performed with respect to a sub-graph that excludes nodes that are not features, and any edges/relationships terminating on such excluded nodes.

The community detection may comprise, for example, a label propagation community detection process, a hierarchical clustering community detection process, an eigenvector-based community detection process, a clique-based community detection process, etc., such as a Louvain community detection process, a Leiden community detection process, or the like, a walktrap community detection process, a spinglass community detection process, and so forth. In one example, the community detection may comprise a connected components process, such as a breadth-first search, a depth-first search, a union find, a distributed parallel union find, a Tarjan's algorithm, or Kosaraju's algorithm, or the like. In one example, the connected components process may comprise a weak connected components process (e.g., an algorithm) to find "weak connected components." However, in another example, the connected components process may comprise a strong connected components process to find "strong connected components."

In one example, feature-to-feature relationship can be defined by users, e.g., in lineage information provided when attempting to add new features to the feature graph. In one example, a feature-to-feature relationship may have a feature-to-feature relationship type such as: "is related to," "is subset of," "is derived from," "is the same as, but disjoint from," "is partially overlapping with," etc. For instance, one feature could be five second location records precise to within 10 meters. Another related feature could be 15 minute location records approximated to within 10 kilometers accuracy that is summarized from the first feature. Thus, these feature may be related, e.g., having a "derived from" relationship. Similarly, a data set may comprise a table of per-call records that include call duration as a column/feature. Another feature (which could be part of another data set, such as another table) may include daily per user aggregated call durations, which could be derived from the first feature. This could be noted via an "is related to" relationship, but could be more specific such as "is derived from" relationship.

In another example, it is possible that the second feature is not derived from the first feature, but could be separately collected via different network equipment. Therefore, although the latter could be calculated from the former, the former is not the actual source of the latter. However, the source of the latter could be yet a third feature in the ontological graph, and could be noted as related to the second feature. In addition, although the actual lineage of the second feature is not the same as the first feature, a user may be aware of the similarity between the first and second features, and may therefore include a relationship of the second feature to the first feature in the lineage information for the second feature (or another data set and/or feature metadata that is reserved for indicating such relationships). As such, all three features may be identified as being related via a community detection process.

In addition to user-defined relationships, in one example, feature-to-feature relationships may be learned, e.g., via ontology-based feature matching and/or fingerprint-based feature matching. For instance, the present disclosure may learn that two features previously unknown to be related may in fact comprise the same feature, but for different non-overlapping or partially overlapping time periods. To illustrate, while leveraging the ontological mappings defined by the feature store, the fingerprint engine can map two features that are not linked by the user explicitly, and may create weighted connections that the user can filter on as needed. As data is updated, the feature store may reevaluate these connections and similarities. With these recommendations and user feedback, the ontological mappings comprise a dynamic graph that is continuously updated and improved over time and with more user interactions with the feature store.

Thus, a feature-to-feature relationship may be added to the feature graph for such features and their relationship. It should be noted that a feature-to-feature relationship may comprise part of a feature ontology (and hence part of the ontology of the feature graph as a whole). Alternatively, or in addition, a feature-to-feature relationship may not be part of the feature ontology (at least as provided during an onboarding of a feature into the graph database), but may be provided by a user separately (e.g., as lineage information or other feature metadata) or may be learned via ontology-based feature matching and/or fingerprint-based feature matching. In any case, the feature-to-feature relationship may be added as an edge/relationship to the feature graph and hence may become part of the feature ontologies (e.g., for both features affected). In this regard, it should be noted that in one example feature-to-feature relationships may be added as edges to the feature graph without breaking the ontology, e.g., features and feature-to-feature relationships can be added as long as they do not get flagged/blocked by an ontology verification process.

Each feature community identified via a community detection process may be assigned a unique community label/ID. The labels may be added as node information for nodes/objects representing features in the feature graph. Alternatively, or in addition, the labels may be added to a data dictionary and/or as feature (or feature set) metadata. In one example, the feature communities may be verified as being accurate in accordance with a node similarity metric. For instance, the present disclosure may calculate a Jaccard measure, may perform node vector embedding and then take an average of the distances between nodes in the community (e.g., a cosine distance or the like), and so forth. When the measure satisfies a threshold (e.g., the similarity measure exceeds the threshold, the distance metric is less than the threshold, etc.), a community may be verified as accurate, and so forth for other communities. In one example, if the similarity measure is low (e.g., below a threshold measure) and/or the distance metric is too high (e.g., exceeds a distance threshold), one or more authorized users may be alerted to resolve inconsistencies or to verify that the communities are valid/acceptable.

In one example, the present disclosure may return at least one feature community in response to a search. For instance, the present disclosure may obtain a search associated with at least one feature of the feature graph database (in other words, the at least one feature may be identified in a result of the search). In addition, the feature may be identified as belonging to a feature community (e.g., according to the feature community label/ID). As such, the present disclosure may provide the feature community (e.g., identification of the feature in the feature community) in response to the search. In one example, the search may specify that a feature community should be included as part of the search results. Alternatively, or in addition, the search may be specifically for a feature community. In still another example, the search may have other parameters. However, in accordance with the present disclosure, the feature community of one or more features identified in the search results may also be provided (e.g., as additional useful information in addition to the features, relationships, or other information of the feature graph that is directly encompassed in the search results in accordance with one or more search terms or search parameters). In one example, the feature community may be provided as a list. Alternatively, or in addition, the feature community may be provided in a graphical form, e.g., as a sub-graph comprising the feature community and the relationships among the features in the feature community.

With respect to telecommunication network operations, the proliferation of Internet of Things devices, higher data rates on fiber-optic cable, and the expansion of 5G and other network technologies may increase the need for accurate network inventory data, while at the same time making this task even more challenging. Although examples of the present disclosure are described herein primarily in connection with telecommunication network inventory and operations, examples of the present disclosure may be further applicable to other systems having large inventories, systems that utilize substantial automated processes, and so forth. For instance, this may include utility systems (e.g., electric power utilities, water services, sanitary/sewerage services, natural gas services, and so forth), city management and operational systems (e.g., a large city may operate hundreds of subway cars, may maintain thousands of miles of track, switching equipment, etc., may maintain a network of traffic lights and other traffic signals, street lights, "smart city" sensors, etc.), organizations with large numbers of customer/account records (e.g., major online retailers, etc.), and so forth.

Notably, a dynamic ontology with feature community/connectivity information allows for rapid exploration at what features are available as the feature store continues to ingest new data sources. Simultaneously, the data dictionary (metadata store) can be updated or modified in real-time, which may trigger an ontology engine to re-define feature communities/groups for the end user. This dynamic mapping allows for such things as ID mapping between data sets without the same primary keys, feature identity resolution, feature lineage, and reach, which defines the span of unique data sets for a given feature community/feature community ID. As such, examples of the present disclosure provide an improved feature store and improved feature graph database/ontological database that avoids duplication, reduces processing time and resource waste, provides a global perspective of reach at the feature level, provides a connected look at which feature sets are available and the span of features at a community ID level, and provides for improved feature discoverability by spotlighting the other members of a feature community. Examples of the present disclosure may also be combined with other data cleansing and exploration methods to achieve an even higher degree of accuracy. These and other aspects of the present disclosure are described in greater detail below in connection with the examples of FIGS. 1-6.

To aid in understanding the present disclosure, FIG. 1 illustrates an example system 100 comprising a plurality of different networks in which examples of the present disclosure may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed-mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing device or processing system, such as computing system 600 depicted in FIG. 6, and may be configured to host one or more centralized and/or distributed system components. For example, a first system component may comprise a database of assigned telephone numbers, a second system component may comprise a database of basic customer account information for all or a portion of the customers/subscribers of the telecommunication service provider network 150, a third system component may comprise a cellular network service home location register (HLR), e.g., with current serving base station information of various subscribers, and so forth. Other system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other system components may include, for example, a layer 3 router, a short message service (SMS) server, a voicemail server, a video-on-demand server, a server for network traffic analysis, and so forth. It should be noted that in one example, a system component may be hosted on a single server, while in another example, a system component may be hosted on multiple servers in a same or in different data centers or the like, e.g., in a distributed manner. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user/subscriber devices. In addition, in one example, any of the endpoint devices 111-113 and 121-123 may comprise a device of an end-user (e.g., of an abstract data visualization service, as referred to herein).

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may comprise a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, an Internet Protocol private branch exchange (IPPBX), and so forth, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and/or users. For example, telecommunication service provider network 150 may provide a cloud storage service, web server hosting, and other services. As such, service network 130 may represent aspects of telecommunication service provider network 150 where infrastructure for supporting such services may be deployed.

In one example, the service network 130 links one or more devices 131-134 with each other and with Internet 160, telecommunication service provider network 150, devices accessible via such other networks, such as endpoint devices 111-113 and 121-123, and so forth. In one example, devices 131-134 may each comprise a telephone for analog or digital telephony, a mobile device, a cellular smart phone, a laptop, a tablet computer, a desktop computer, a bank or cluster of such devices, and the like. In an example where the service network 130 is associated with the telecommunication service provider network 150, devices 131-134 of the service network 130 may comprise devices of network personnel, such as customer service agents, sales agents, marketing personnel, or other employees or representatives who are tasked with addressing customer-facing issues and/or personnel for network maintenance, network repair, construction planning, and so forth. Similarly, devices 131-134 of the service network 130 may comprise devices of network personnel responsible for operating and/or maintaining various data storage systems (e.g., database administrators).

In the example of FIG. 1, service network 130 may include one or more servers 135 which may each comprise all or a portion of a computing device or processing system, such as computing system 600, and/or a hardware processor element 602 as described in connection with FIG. 6 below, specifically configured to perform various steps, functions, and/or operations for providing search results comprising features of a feature graph database that are labeled with a first community label in response to a search associated with at least one of the features, as described herein. For example, one of the server(s) 135, or a plurality of servers 135 collectively, may perform operations in connection with the example method 500 of FIG. 5, or as otherwise described herein. Similarly, one or more of the server(s) 135 may represent a data consistency platform or processing system. In other words, one or more of the server(s) 135 may provide a data consistency service and/or a data element relationship identification service. Alternatively, or in addition, one or more of the server(s) 135, or one or more of the server(s) 135 in conjunction with one or more of DB(s) 136 may represent a feature store as described herein. In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 6 and discussed below) or multiple computing devices collectively configured to perform various steps, functions, and/or operations in accordance with the present disclosure.

In one example, the one or more databases (DBs) 136 may comprise data repositories comprising physical storage devices integrated with server(s) 135 (e.g., database servers), attached or coupled to the server(s) 135, and/or in remote communication with server(s) 135 to store various types of information in support of examples of the present disclosure for providing search results comprising features of a feature graph database that are labeled with a first community label in response to a search associated with at least one of the features. In one example, DB(s) 136 may store various features as part of a feature store, which can be used for various purposes, such as for training machine learning models, for applying as inputs to machine learning models for generating predictions, inferences, or the like, and so forth. The features may be stored as part of various data sets.

In one example, a data set may comprise one or more data tables having one or more columns and one or more rows (e.g., where the column(s) and row(s) may be referred to as data elements). As referred to herein, a "feature" may comprise a column of a data table. However, in some cases, a "feature" may comprise a vector of values (which may be considered as a single-column table). Each feature, whether part of a table or a standalone feature, may have a feature label, or feature name (e.g., a column title/header). In addition, each feature may have feature/column metadata comprising an ontology of the feature. In one example, the feature/column metadata for one or more features may also have lineage information and/or fingerprint information. The feature/column metadata may be stored in association with each feature/column (e.g., on a per feature/column basis) or may be stored as part of data set and/or data table metadata. In one example, a "feature store" may comprise all of the available features (and data sets). In one example, metadata of the feature store may comprise a "data dictionary."

In some cases, feature data may be automatically uploaded to DB(s) 136 and/or retrieved by DB(s) 136 and/or server(s) 135 for storage in DB(s) 136. For instance, DB(s) 136 may maintain a data table comprising customer account records that may be updated on an ongoing basis as customer account information changes, and as such changes are recorded via various systems, such as via server(s) 155. Alternatively, or in addition, features may be uploaded to DB(s) 136 in accordance with a user input/request. For instance, network personnel may obtain permission to upload one or more $3^{rd}$ party data sets.

Figure 3:
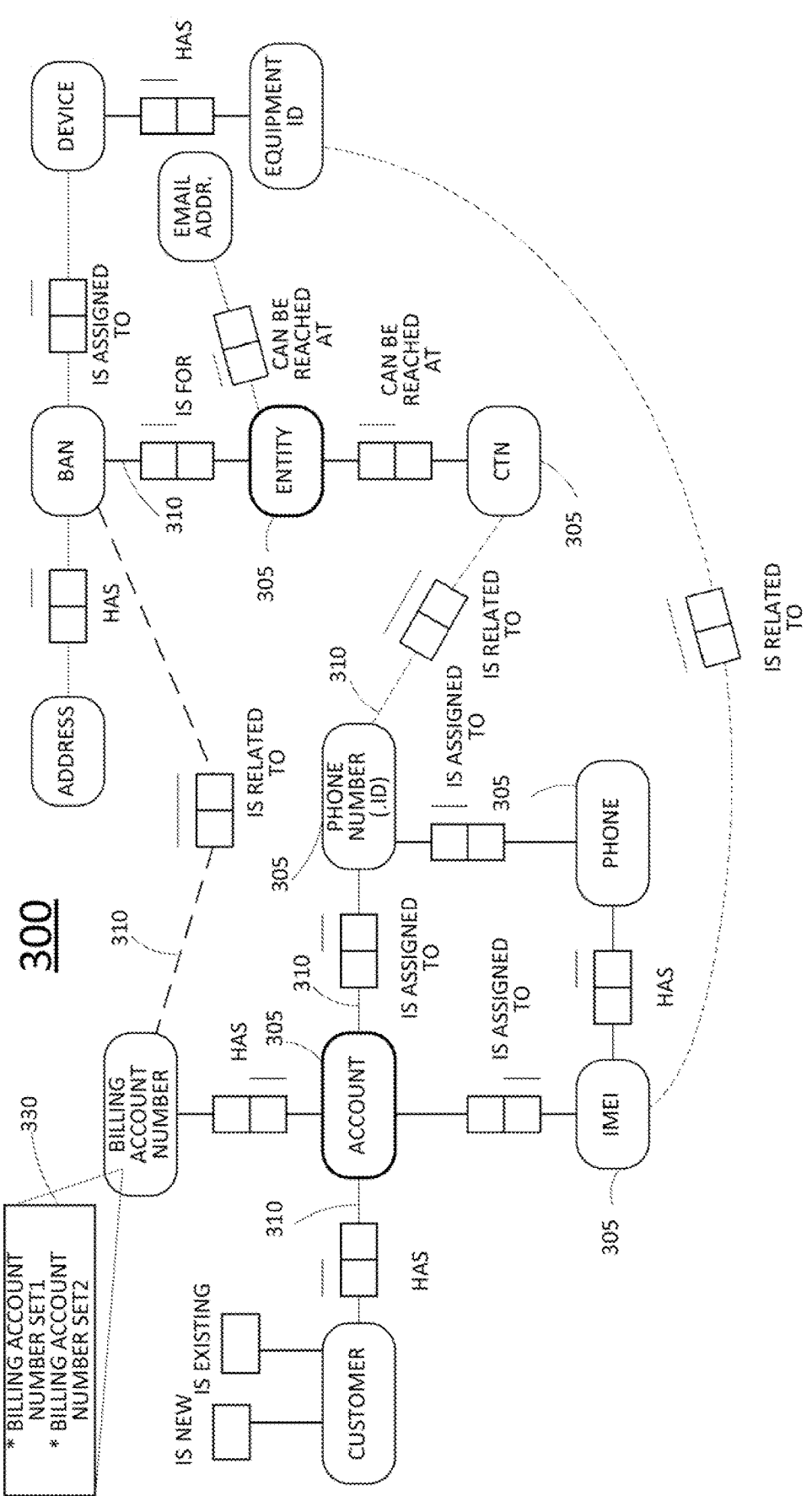
FIG. 3 illustrates an example feature graph, or feature graph database, in accordance with the present disclosure.

In one example DB(s) 136 may maintain a feature graph database, or "feature graph," which may comprise an ontology graph, or "ontological graph" in accordance with the present disclosure. Notably, the feature graph may maintain a view of the relationships of features available in the feature store to various concepts, as well as the relationships among features with each other. In one example, server(s) 135 may enable a search for features via ontological searches over the feature graph. An example feature graph is illustrated in FIG. 3 and described in greater detail below. It should be noted that the feature graph represents ontological relationships of features to concepts and among the features themselves at a feature level. However, one or more other graph databases may be used to represent the relationships among various network elements, relationships among users or other entities (e.g., a social graph), and so forth. In other words, the underlying data of various data sets and the relationships indicated by the underlying data may be reflected in other graph databases, which may alternatively or additionally be stored in DB(s) 136 or in another data storage system.

In view of the above, DB(s) 136 may be configured to receive and store network operational data collected from the telecommunication service provider network 150, such as call logs, mobile device location data, control plane signaling and/or session management messages, data traffic volume records, call detail records (CDRs), error reports, network impairment records, performance logs, alarm data, television usage information, such as live television viewing, on-demand viewing, etc., and other information and statistics. In accordance with the present disclosure, a data set may comprise a number of data elements selected from data of these data sources (e.g., at least a portion of the records from each of these data sources). For instance, in the case of mobile device location data, new location data is continuously collected by the telecommunication service provider network 150. This data may be added as new records to one or more data sets stored in DB(s) 136 on an ongoing basis, e.g., hourly, daily, etc. In addition old mobile device location data records may be released from DB(s) 136 on an ongoing basis and/or may be aggregated, averaged, etc., and stored as new data in DB(s) 136. In one example, a data set may comprise a data table that may have defined relationships to other data sets/data tables, which may have defined relationships among columns and/or rows of such data table, or which may have unknown/undefined relationships. In one example, relationships among data elements (e.g., table-to-table, column-to-column, etc.) may be learned via extract, transform, and load (ETL) processing and/or automated data profiling operations in accordance with the present disclosure, and added to the respective data element(s) and/or data set(s) as metadata (e.g., as part of a data element or data set "profile"). In one example, these relationships or aspects thereof may be identified as lineage information that may be used for feature matching (e.g., identifying possible duplicate features) as well as for feature community detection as described herein.

In one example, data from server(s) 155 may be further compiled and processed, e.g., normalized, transformed, tagged, etc. (e.g., ETL processing) for storage as further data elements within DB(s) 136. In one example, data elements (e.g., rows and/or columns) may be further organized into one or more data sets via an ETL process, such as in accordance with a system operator configuration that defines ownership and/or other associations of data elements to data sets. In one example, a data element may belong to more than one data set. In another example, a data element may be replicated such that different data sets have respective copies of the data element. In one example, network operational data may further include data and/or records collected from access networks 110 and 120 (e.g., where access networks 110 and 120 are a part of and/or controlled by telecommunication service provider network 150), such as from cellular base station equipment, data reported by and collected from endpoint devices 111-113 and 121-123, or the like, and so forth.

In one example, one or more features of one or more data sets of the data from server(s) 155 may be entered into a feature graph. In one example, network personnel may provide a feature ontology for a feature, which indicates how the feature is to be included in the feature graph. For instance, for each new feature, an "individual" or "object" (e.g., a node) may be added to the feature graph, where the feature ontology (and/or lineage information) may indicate the relationships (e.g., edges) to be added for connecting the object to other nodes (e.g., classes/concepts and/or other individuals/objects). It should be noted that when a feature is added to the feature graph, it may become searchable and discoverable via an ontological search over the feature graph. In some cases, the underlying data for the feature may continue to be collected and added to a data set as new or changed data records. Thus, the data set may change as old data is removed from the data set, and so forth. In other cases, the feature and/or the data set containing the feature may be static or fixed at the time of adding to the feature graph. In other words, the feature and/or the data set may comprise "historical data." In any case, the feature graph may be used for feature discovery, where the feature graph may include a link for each feature to the storage location(s)

where the actual feature data records may be stored (e.g., a part of a data set). Accordingly, the underlying data records of a feature may be retrieved separately when it may be determined that the feature is to be used, e.g., for machine learning model training and/or prediction, or other purposes.

In one example, DB(s) 136 may alternatively or additionally be configured to receive and store records from customer, user, and/or subscriber interactions, e.g., with customer facing automated systems and/or personnel of a telecommunication network service provider or other entities associated with the service network 130. For instance, DB(s) 136 may maintain call logs and information relating to customer communications which may be handled by customer agents via one or more of the devices 131-134. For instance, the communications may comprise voice calls, online chats, etc., and may be received by customer agents at devices 131-134 from one or more of devices 111-113, 121-123, etc. The records may include the times of such communications, the start and end times and/or durations of such communications, the touchpoints traversed in a customer service flow, results of customer surveys following such communications, any items or services purchased, the number of communications from each user, the type(s) of device(s) from which such communications are initiated, the phone number(s), IP address(es), etc. associated with the customer communications, the issue or issues for which each communication was made, etc. For instance, there may be different data elements comprising records of customers' voice calls, customers' text chats, and customers' online interactions, respectively, which may be associated with one or more data sets. Similar to the above, one or more features of one or more data sets associated with customer, user, and/or subscriber interactions may be represented in a feature graph, e.g., in accordance with feature ontologies (and/or lineage information) indicating the relationships of such features to one or more classes/concepts and/or to other features (e.g., other individuals/objects).

Alternatively, or in addition, any one or more of devices 131-134 may comprise an interactive voice response system (IVR) system, a web server providing automated customer service functions to subscribers, etc. In such case, DB(s) 136 may similarly maintain records of customer, user, and/or subscriber interactions with such automated systems (e.g., as one or more data sets, such as tables, or rows and/or columns within one or more tables). The records may be of the same or a similar nature as any records that may be stored regarding communications that are handled by a live agent. Similarly, any one or more of the devices 131-134 may comprise a device deployed at a retail location that may service live/in-person customers. In such case, the one or more of devices 131-134 may generate records that may be forwarded and stored by DB(s) 136. The records may comprise purchase data, information entered by employees regarding inventory, customer interactions, surveys responses, the nature of customer visits, etc., coupons, promotions, or discounts utilized, and so forth. In still another example, any one or more of the devices 111-113 or 121-123 may comprise a device deployed at a retail location that may service live/in-person customers and that may generate and forward customer interaction records to DB(s) 136. The records may be maintained as one or more data sets, such as data tables that contain records for different time blocks (e.g., different data tables for different days' records), data tables that contain records from different locations (e.g., a first table may store records from a first retail location, while a second table may store records from a second retail location, and so forth). As above, one or more features of one or more data sets associated with automated customer, user, and/or subscriber interactions may be represented in a feature graph, e.g., in accordance with feature ontologies (and/or lineage information) indicating the relationships of such features to one or more classes/concepts and/or to other features (e.g., other individuals/objects).

Thus, the various data and/or records collected from various components of telecommunication service provider network 150 (e.g., server(s) 155), access networks 110 and 120, and/or service network 130 may be organized into data elements (e.g., rows and/or columns). This includes both "streaming" and "batch" data, or both "data at rest" and "data in motion." In one example, the data elements may be collected as one or more "data sets" or may be assigned to/associated with one or more data sets as received. Alternatively, or in addition, data elements may be assigned to one or more data sets after being received at DB(s) 136.

In one example, DB(s) 136 may alternatively or additionally receive and/or store data from one or more external entities. For instance, DB(s) 136 may receive and store weather data or traffic data from a device of a third-party, e.g., a weather service, a traffic management service, etc. via one of the access networks 110 or 120. To illustrate, one of the endpoint devices 111-113 or 121-123 may represent a weather data server (WDS). In one example, the weather data may be received via a weather service data feed, e.g., an NWS extensible markup language (XML) data feed, or the like. In another example, the weather data may be obtained by retrieving the weather data from the WDS. In one example, DB(s) 136 may receive and store weather data from multiple third-parties. In still another example, one of the endpoint devices 111-113 or 121-123 may represent a server of a traffic management service and may forward various traffic related data to DB(s) 136, such as toll payment data, records of traffic volume estimates, traffic signal timing information, and so forth. Similarly, one of the endpoint devices 111-113 or 121-123 may represent a server of a bank, an insurance entity, a medical provider, a consumer credit entity (e.g., a credit bureau, a credit card company, etc.), a merchant, or the like. In such an example, DB(s) 136 may obtain one or more data sets comprising information such as: consumer credit scores, credit reports, purchasing information and/or credit card payment information, credit card usage location information, and so forth (e.g., as one or more data elements, such as tables, table columns, etc.). Alternatively, or in addition DB(s) 136 may receive the same or similar data as one or more data feeds, which may be organized into one or more data sets comprising one or more data tables to be stored by DB(s) 136. In one example, one of the endpoint devices 111-113 or 121-123 may represent a server of an online social network, an online gaming community, an online news service, a streaming media service, or the like. In such an example, DB(s) 136 may obtain one or more data sets/data feeds comprising information such as: connections among users, specific media or types of media accessed, the access times, the durations of media consumption, games played, durations of game play, and so forth. It should be noted that for all of the above examples, the data, records, or other information collected from external entities may also be organized into and referred to as "data elements." In one example, the data elements may be received as one or more "data sets," or may be assigned to one or more data sets after being received at DB(s) 136. As above, one or more features of one or more 3rd party data sets may be represented in a feature graph, e.g., in accordance with feature ontologies (and/or lineage information) indicating the relationships of such features to one or more classes/concepts and/or to other features (e.g., other individuals/objects).

In one example, a user, e.g., network personnel or a $3^{rd}$ party, may provide a feature ontology for a feature, which indicates how the feature is to be included in the feature graph. For instance, for each new feature, an "individual" or "object" (e.g., a node) may be added to the feature graph, where the feature ontology may indicate the relationships (e.g., edges) to be added for connecting the object to other nodes (e.g., classes/concepts and/or other individuals/objects). In one example, a user may also provide lineage information (which may also indicate feature-to-feature relationships that may not necessarily be part of the ontology). In one example, data sets and/or features may be stored in one or more other data repositories/storage systems, while DB(s) 136 may store and maintain a graph database that indicates the existence of various features and information to access the underlying data of the various features (e.g., links, such as uniform resource locators (URLs), application programming interface (API) calls, and so forth that are usable to retrieve the underlying feature data from one or more other data repositories/storage systems).

In accordance with the present disclosure, DB(s) 136 may further store metadata associated with various data sets and/or data elements, data schema(s) (e.g., for data formatting, data naming, data size, etc.), and so forth. In one example, the metadata may include profiles of data sets (which may include profiles or "fingerprints" of data elements of the data sets). For instance, a fingerprint/profile of a data element may comprise the characteristics thereof, such as for a data column: a data type of the column, a mean of the column values, a median, a standard deviation, a high value, a low value, a uniqueness metric, a Tversky index, and so forth. In accordance with the present disclosure, the fingerprint/profile may also include time information associated with a feature and/or a data set, such as the time range of the entries (e.g., records of all in-person retail transactions at a store within a 6 month time span, records of all server crashes in a particular data center within a 2 month time span, etc.) and/or a time interval represented by each entry (e.g., indications that records of a data set may comprise 30 second samples, 30 second averages, 5 minute samples, 5 minute average, etc.). In accordance with the present disclosure, the profile may further include lineage information, e.g., identifications of one or more related data elements (e.g., as determined in accordance with the present examples and/or as labeled by one or more users).

In one example, the metadata may also include feature ontologies for various feature, which for a given feature may define relationships of the feature to one or more concepts/classes and/or to one or more other features. In one example, the feature ontologies may additionally include "properties" of the feature. For instance, this may include a fingerprint/profile of the feature and/or other properties. However, in another example, when a feature is added to a feature graph, a feature ontology may be provided and the feature may be added to the feature graph accordingly (e.g., if not a duplicate). In such case, the feature ontology may be stored in connection with the feature and/or data set as metadata, or may simply be represented in the feature graph. In other words, in one example, it is not necessary to store the feature ontology as metadata along with the underlying feature data, since the feature ontology is stored in the structure of the feature graph itself.

In addition, with respect to all of the above examples, it should be noted that the data sets and/or data elements (e.g., features/columns and/or rows) of data sets may be accessed by server(s) 135 and/or DB(s) 136 via application programming interfaces (APIs) or other access mechanisms between computing systems, and may include data that is specifically formatted and/or processed so as to maintain user privacy and/or anonymity, and/or such that the data that is accessed is in accordance with user-granted permissions, preferences, or the like, as well as any applicable contractual, legal, and/or regulatory obligations of either the provider(s) of such data, and/or the operator of server(s) 135 and/or DB(s) 136, as an accessor of the data.

In one example, server(s) 135 may generate and/or maintain a feature graph, e.g., in DB(s) 136. For instance, as noted above nodes may represent features (e.g., "individuals" or "objects") and concepts/classes (and in one example, properties of features), and the edges may represent the relationships between the features and/or between features and classes (and in one example, between features and the respective feature properties). Server(s) 135 may generate and/or maintain a data dictionary associated with the feature store and/or the feature graph, e.g., in DB(s) 136. In view of the above, it should be noted that in one example, server(s) 135 may receive requests to add new features to the feature graph. In one example, server(s) 135 may perform a verification process that may ensure, inter alia, that a duplicate feature is not introduced into the feature graph, that a feature is added in a correct configuration in the feature graph, that feature names do not conflict, and so forth. To illustrate, server(s) 135 may obtain a request to add a first feature to a feature graph. For instance, the request may be received from personnel with authorized access to the feature graph, from one or more automated systems, and so forth. For instance, the request may be received from one of the devices 131-134. The request may relate to adding a plurality of features of a feature set to the feature graph, or may relate to just the first feature.

For illustrative purposes, the first feature may have a first feature ontology. For instance, the first feature ontology may comprise at least one "triple" that includes a label of the first feature, the concept (or "class"), and a relationship of the first feature to a concept or to another feature. In one example, the relationship may define a relationship type (e.g., "is an example of," "has," "is manufactured by," etc., which may be set forth in a triple such as "feature 1 is an example of concept A," "Concept B has Feature 1," etc.). Server(s) 135 may then identify whether the first feature is a duplicate of a second feature in the feature graph database based at least upon the first feature ontology and a second feature ontology of the second feature. For instance, the first feature ontology may identify the concept, or the user may separately provide an indication of the "concept" to which the user believes the feature is most related. Server(s) 135 may then access the concept in the feature graph (if such concept is already contained in the feature graph) and may identify any connected features (e.g., features having relationships to the concept and/or features having two-hop connections to the concept, etc.).

In one example, lineage information may also be provided or may be included in feature metadata along with the request. Accordingly, in one example, server(s) 135 may also access any features in the feature graph that may be identified in accordance with the lineage information. Alternatively, or in addition server(s) 135 may also identify and access any features in the feature graph that may have a same feature label/feature name as the first feature (e.g., even if not identified via the other methods above). For any existing features in the feature graph identified via any or all of such methods, server(s) 135 may then identify the feature ontologies of such features (e.g., including at least for the second feature). For instance, the feature ontologies may be implicit in the feature graph structure based on the edges/relationships. In one example, the edges/relationships may be labeled with a relationship type. As such, server(s) 135 may compare the feature ontologies of one or more existing features to the first feature ontology of the first feature that is to be added to the feature graph.

Server(s) 135 may then generate an indication of whether the first feature is a duplicate in response to the identifying. For instance, in the event that the first feature is determined to be an identical duplicate to the second feature, server(s) 135 may provide the indication that the first feature is a duplicate, e.g., to the requesting entity via one of devices 131-134. In the event that the first feature is determined to be a same feature as the second feature but for a different time block and/or for partially overlapping time blocks, the indication may identify this determination. In one example, server(s) 135 may add the first feature to the feature graph, such as linked to the second feature with an edge/relationship indicating that the first feature is the same as the second feature but for a different time block.

In one example, server(s) 135 may perform additional operations such as confirming that features are the same, and if so, whether the features are fully overlapping, partially overlapping, or disjoint in time (or whether features that appear to be the same are different) via further analysis. For example, server(s) 135 may compare fingerprints of the first feature and one or more existing features (e.g., including at least the second feature). For instance, the fingerprints, or profiles, may include statistical metrics, e.g., mean, median, high value, low value, entropy, uniqueness factor, etc. samples of the actual data contained therein, timing information, and so forth.

In one example, server(s) 135 may add edges/relationships for feature-to-feature relationships to the feature graph in accordance with feature lineage information (e.g., one or more feature-to-feature relationships that is/are not necessarily part of the feature ontology). In one example, these edges/relationships may be of a different type to distinguish from ontological edges/relationships. For instance, lineage information of the feature "IMEI" may indicate that it is related to the feature of "EquipmentID." However, the former feature may belong to the concept of "Account" while the latter may belong to the concept of "Entity."

In one example, server(s) 135 may apply a community detection process to the feature graph database to identify a plurality of communities of features within the feature graph database. For instance, server(s) 135 may perform this process periodically, e.g., daily, weekly, etc. and/or may perform this process in response to an addition of a threshold number of features and/or a threshold number of data sets to the feature graph database. In one example, the community detection process is applied with respect to feature-to-feature relationships in the feature graph (e.g., and excluding feature-to-concept, concept-to-concept, or other relationships). As noted above, the feature-to-feature relationships may exist in the feature graph in accordance with one or more feature ontologies (and the ontology of the feature graph as a whole) and/or in accordance with lineage information that may indicate non-ontological relationships among features. For instance, non-ontological relationships may include two features being the same (e.g., having the same ontology and both containing the same type of data) but being non-overlapping/disjoint in some way. For instance, two features may both contain address data, but for different states. Similarly, two (or more) features may contain network traffic measurements, but for different network zones, may contain call records, but for different time periods, and so forth.

As noted above, the community detection process may comprise, for example, a label propagation community detection process, a hierarchical clustering community detection process, an eigenvector-based community detection process, a clique-based community detection process, etc. In one example, the community detection process may comprise a connected components process, such as a breadth-first search, a depth-first search, a union find, a distributed parallel union find, etc. In one example, the connected components process may comprise a weak connected components process. In another example, the connected components process may comprise a strong connected components process. In one example, server(s) 135 may verify the plurality of communities (e.g., confirm the accuracy of the result), such as in accordance with a node similarity metric. In any case, the result is a plurality of feature communities (e.g., connected components) each comprising one or more features. Accordingly, in one example, server(s) 135 may further label at least a first plurality of features of the feature graph database with at least a first community label (e.g., for features in at least a first community/connected component), and so on for other features in additional communities/connected components. In one example, the labeling may include labeling entries for feature in a data dictionary associated with the feature graph (e.g., in addition to labeling nodes/objects representing features in the feature graph).

In one example, server(s) 135 may provide community labels for feature communities in response to searches over the graph database. For instance, server(s) 135 may obtain a search associated with at least one feature of the feature graph database, and may provide features of a feature community in response to the search (e.g., in addition to identifying the at least one feature that may be responsive to the search query). In other words, the feature community may be provided as additional information for any feature that may be returned in accordance with a search. Alternatively, or in addition, a user may specifically query for a feature community associated with a feature, responsive to which the feature community may be provided as a direct result. In still another example, the community label may be provided, in response to which a user may perform an additional search. For example, the user may request to retrieve the features of the feature community, e.g., using the community label as a search key.

Server(s) 135 may alternatively or additional perform various other operations as described herein. For instance, a flowchart of an example method 500 for providing search results comprising features of a feature graph database that are labeled with a first community label in response to a search associated with at least one of the features is illustrated in FIG. 5 described in greater detail below. In one example, server(s) 135 may perform such operations on an ongoing basis, e.g., as additional requests to add new features are received.

In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in telecommunication service provider network 150, and so forth. Thus, these and other modifications are all contemplated within the scope of the present disclosure.

To further aid in understanding the present disclosure, FIG. 2 illustrates an example of a feature set 200 to be added to a feature store, e.g., one having a searchable feature graph or feature graph database. For instance, the feature set 200 may be named "Sample 51" and may have several features. Each feature may have a feature name/label, a concept to which the feature relates, and a "recipe" (e.g., one or more triples, or "ingredients") comprising the feature ontology. For instance, the concepts and recipes may be provided by a user requesting to add the features of feature set 200 to a feature graph. In one example, the feature set 200 may also include lineage information (if available/provided). In addition, in one example, the feature set 200 may also be provided with additional metadata (not shown), such as feature fingerprints (e.g., which may include timing information, statistical data of a feature, and/or other information). As noted above, the present disclosure may perform a feature duplicate check process prior to adding any features to the feature graph.

To further aid in understanding the present disclosure, and continuing with the present example, FIG. 3 illustrates an example feature graph 300 that may relate to the feature set 200 of FIG. 2. For instance, the request may be to add the features of feature set 200 of FIG. 2 to the feature graph 300 of FIG. 3. In the feature graph 300, there may be a plurality of nodes 305 and edges 310. For ease of illustration, only a few of the nodes 305 and edges 310 are specifically labeled. In one example, the feature graph 300 may represent a sub-graph of a larger feature graph. For instance, the feature graph 300 may illustrate the relevant nodes 305 and relationships/edges 310 related to the concepts, or classes of "Account" and "Entity," while the larger graph may include various additional concepts (and the features associated therewith). In accordance with the present disclosure at least a portion of the edges 310 may include relationship labels, such as "has" for an edge between nodes/objects "CTN" and "Entity." The line over the box may indicate a respective subject and predicate of the triple/ingredient (e.g., the node/object closer to the line is the subject and the other is the predicate of the triple). It should also be noted that in accordance with the present disclosure, while some classes/concepts are purely conceptual, some classes/concepts may also comprise features within the feature store. It should also be noted that additional nodes 305 may represent "properties" or "attributes" of features. For instance, "is new," "is existing," etc. may be possible attributes of "customer."

Referring to the feature set 200 of FIG. 2, a first feature may comprise "IMEI" which may be identified as being associated with the concept of "Account" and having a recipe, or feature ontology of: "IMEIsAssignedToAccount" and "PhoneHasIMEI." In one example, the present disclosure may identify existing features in the feature graph 300 that may be evaluated for determining whether the new feature of "IMEI" is already represented by an existing feature. For instance, in one example, the present disclosure may identify any existing features that have same name/feature label (e.g., "IMEI"). In one example, the present disclosure may also identify existing features to evaluate based on the concept and recipe, or feature ontology of the first feature. For instance, for the feature of "IMEI" in the feature set 200, the concept of "Account" is identified. As such, the present disclosure may access the concept of "Account" in the feature graph 300. The present disclosure may then identify any features connected to this concept (e.g., one-hop relations, two-hop relations, etc.) and may identify the features' respective feature ontologies. For instance, there may be a feature of "Customer" which has a feature ontology or recipe of "CustomerHasAccount" indicated by one of the edges 310. In addition, a feature of "Phone" has a feature ontology of "PhoneNumberIsAssignedToPhone" and "PhoneHasIMEI," and so on for other features, such as "Phone Number" and "Billing Account Number."

Accordingly, the present disclosure may compare the recipe of "IMEI" in the feature set 200 to the respective recipes associated with different features in the feature graph 300 related to the same concept, or identified as having a same name/feature label. In one example, an exact ontological match may cause the present disclosure to flag the new feature as a potential duplicate. Similarly, when the feature ontology of the new feature differs from a feature ontology of an existing feature only by the name of the feature (e.g., as either the subject or predicate of a triple), the present disclosure may flag the new feature as a potential duplicate. In this case, the recipe for "IMEI" may be unique. In addition, there may be no existing feature called "IMEI." As such, the feature of "IMEI" may be added to the feature graph 300 in accordance with its recipe (e.g., including new edges connecting to nodes/objects for "Account" and "Phone").

More generally, a verification of whether to add a new feature to the graph database 300 may comprise identifying one of several alternatives: (A) the new feature and an existing feature have the same label/name and same feature ontology, (B) the new feature and an existing feature have the same label/name and different feature ontologies, (C) the new feature and an existing feature have different labels/names and a same or similar feature ontology, and (D) the new feature and an existing feature have different labels/names and different feature ontologies.

In one example, the result (A) may indicate that the first feature is a potential duplicate of the second feature, the result (B) may indicate that the first feature and the second feature are different, the result (C) may indicate that the first feature is a potential duplicate of the second feature, and the result (D) may indicate that the first feature and the second feature are different. In one example, following a determination of (A), (B), or (C), the present disclosure may further determining whether fingerprint information of the new feature matches fingerprint information of the existing feature. To illustrate, with respect to (A), if the new feature and the existing feature have the same label/name and same feature ontology, a comparison of the fingerprint information/profiles of the new feature and the existing feature may confirm that the new feature is a duplicate, may reveal that the new feature may be from a non-overlapping and/or partially overlapping time block as compared to the existing feature, or may contraindicate that the new feature appears to be different from the existing feature. For instance, as noted above, the fingerprint information of the new feature may include timing information of the underlying data records of the new feature and/or at least one statistical metric of the underlying data records of the new feature (and similarly for the fingerprint information of the existing feature).

In one example, when the timing information is different, the present disclosure may identify that the new feature is the same as the existing feature, but for a different time period. In one example, if the timing information is the same, a matching score may then be calculated as a weighted score based on a similarity and/or difference between one or more aspects of the fingerprint information, such as between respective mean values, high values, low values, uniqueness metrics, Tversky indexes, etc. In one example, when the matching score exceeds a threshold, the present disclosure may confirm that the new feature is a duplicate of the existing feature. On the other hand, when the matching score does not exceed a threshold, the present disclosure may reach an inconclusive determination. In other words, the label and feature ontology matching is in contrast to the respective fingerprint information being different.

Similarly, with respect to (B), if the new feature and the existing feature have the same name/label and different ontologies, the present disclosure may determine whether the timing information matches and may calculate a matching score of the fingerprint information. If the matching score of the fingerprint information does not exceed the threshold and the timing information is the same, the present disclosure may reach a conclusion that the new feature and the existing feature are different (and that the new feature should be renamed/relabeled to avoid confusion). If the matching score of the fingerprint information does not exceed the threshold and the timing information is different, the present disclosure may reach an inconclusive determination. In other words, it is unclear if the new feature and existing feature are different, or whether the new feature and the existing feature are the same but are just for different time blocks. However, if the new feature and the existing feature have the same name/label and different ontologies, and if the matching score of the fingerprint information exceeds the threshold, the present disclosure may conclude that the features are the same, but the ontologies are inconsistent (and additionally, that the first feature is a duplicate of the second feature and should not be added to the feature graph database).

With respect to (C), a matching score may be calculated. When the timing information is the same and the matching score exceeds a threshold, the present disclosure may confirm that the new feature is a duplicate of the existing feature. On the other hand, when the matching score does not exceed the threshold and the timing information is the same, the present disclosure may reach a determination that the new feature and the existing feature are different. When the matching score does not exceed the threshold and the timing information is different, the present disclosure may reach an inconclusive determination.

Accordingly, in connection with the examples of FIGS. 2 and 3, the present disclosure may apply the above process to the additional features of the feature set 200 to determine whether to add the features of "Manufacturer," "Billing Account Number," and so forth. In view of the foregoing, some of these features may be added as new features to the feature graph 300, some features may be recorded as being the same as an existing feature but temporally disjoint or partially overlapping or disjoint in another way, some features may be flagged for correction of feature labels (e.g., changing "Cost" to "Price"), correcting feature ontologies, etc., and so forth. Thus, for example, "Billing Account Number" from feature set 200 may be the same feature as another "Billing Account Number" but may comprise records from different states, and hence may be non-overlapping. In this case, the new "Billing Account Number" may be added by updating node information 330 for the "Billing Account Number" node/object (e.g., "Billing Account Number 1" may represent the existing feature, and "Billing Account Number 2" may represent the new feature added from feature set 200). In addition, the feature "Cost"

may be renamed to "Price" and the feature ontology corrected from "PhoneHasCost" to "PhoneHasPrice."

As noted above, in one example, a feature graph may also include non-ontological relationships. For instance, the feature graph 300 of FIG. 3 illustrates edges 310 for feature-to-feature relationships "IMEIIsRelatedToEquipmentID," "BillingAccountNumberIsRelatedToBAN," and "PhoneNumberIsRelatedToCTN." In one example, a community detection process may be applied with respect to these non-ontological feature-to-feature relationships (e.g., a sub-graph comprising these edges 310 and the nodes/objects 305 connected by such edges 310). In one example, additional edges 310 of feature-to-feature relationships may also be included in the community detection process (such as edges 310 included in the graph 300 in accordance with one or more feature ontologies), such as the edge 310 between "PhoneNumber" and "Account."

In one example, feature-to-feature relationships may be identified and added to the feature graph 300 based on fingerprint matching. For instance, two feature may be different (e.g., having different ontologies and different data). However, the data may have a similarity score that exceeds a threshold such that the two features are potentially related. In one example, a non-ontological relationship may be added to the feature graph 300 to indicate the relation. Alternatively, or in addition, the potential relationship may be alerted to one or more authorized users, any one or more of which may confirm the relationship and authorize the addition of a new edge 310 to the feature graph 300 for the non-ontological relationship.

To further aid in understanding the present disclosure, FIG. 4 illustrates an example data dictionary 410 and an example of corresponding feature communities 420. For instance, data dictionary 410 may comprise a metadata table or index regarding features within a feature store (e.g., where all or at least a significant portion of the features are represented in a feature graph database). In one example, the features (and the feature sets) identified in the data dictionary 410 may be represented in a reverse order of entry into a feature graph/feature graph database associated with the feature store. For instance, features having feature IDs 13 and 14 of feature set E may be the oldest entries, while features having feature IDs 1-3 of feature set A may be the newest additions to the feature store (and to the feature graph database representing the contents of the feature store). However, it should be noted that in other, further, and different examples, a data dictionary may be maintained in a different order, such as in temporally ascending order, in alphabetical order by feature set name (and secondarily by feature name), and so forth.

In one example, the group ID and group name may be added to an entry for each feature in accordance with a community detection process, such as a connected components process. For instance, the feature communities 420 may represent the result of such a process that may be applied to a feature graph, such as the feature graph 300 of FIG. 3. In the example of FIG. 4, user labels are illustrated in connection with the entries of data dictionary 410, which represent feature-to-feature relationships. In one example, these user labels may comprise lineage information that may be obtained in connection with a feature, or feature set to be added to a feature store (e.g., and to a feature graph database associated therewith). Notably, these feature-to-feature relationships may be represented in feature graph 300, such as relationships 310 illustrated in dotted lines (e.g., "PhoneNumberIsRelatedToCTN," "IMEIIsRelated-ToEquipmentID," and "BillingAccountNumberIsRelated- ToBAN"). In one example, feature-to-feature relationships may be added to a feature ontology, or may be represented in a feature graph as a specific type of relationship/edge that is not considered to be part of the ontology of the feature graph (and thus, separate from any feature ontologies of features within such a feature graph), e.g., "non-ontological relationships."

It should be noted that as features are added to the feature store (and to the feature graph), the corresponding feature communities may change and evolve. For instance, as noted above, features may be added in an order from the bottom to the top of the data dictionary 410. To illustrate, reference is made to the features of group 3 ("BAN") of the feature communities 420. At first, when feature set E is added, the feature of "BillingAccountNumber" (line 13) may be a community by itself. Later, when feature set D is added, a user label may be provided that associates the feature of "wirelessBan" (line 11) with the feature "BillingAccount-Number" (line 13). Thus, "wirelessBan" (line 11) and "BillingAccountNumber" (line 13) may be a community. Thereafter, when features of feature set B are added, "wirelessBan" (line 11) and "BillingAccountNumber" (line 13) remain in one community, while the feature of "BAN" (line 4) is a community by itself. Lastly, when features of feature set A are added, user labels may be provided that link "BAN" (line 3) to "BAN" (line 4) and "BAN" (line 3) to "wirelessBan" (line 11). Notably, when a community detection process is again applied, these links/relationships may result in the feature community of "group 3" that includes: "BAN" (line 3), "BAN" (line 4), "wirelessBan" (line 11), and "BillingAccountNumber" (line 13).

Similarly, the features of "ApplicationID" (line 14) and "AID" (line 12) may exist as separate communities until the feature of "AppID" (line 1) is added as part of feature set A along with the corresponding user labels linking to "ApplicationID" (line 14) and "AID" (line 12). In one example, the present disclosure may assign group identifiers (IDs)/labels to groups 1, 2, 3, 4, etc. based on the order of finalization of communities via community detection. In another example, each feature may be assigned a unique and sequential ID when added to the feature graph database. In one example, a group ID may then be assigned to a community/group by selecting a largest numeric feature ID in a group and adding a digit signifying group ID, such as appending a "9" as the most significant digit, or the like. It should again be noted that feature community information (e.g., a feature community to which a feature belongs and/or the members of a feature community) may be provided as additional information responsive to searches associated with one or more features. The search may be over the feature graph (e.g., an ontological search, such as over feature graph 300 of FIG. 3) and/or may be over the data dictionary 410 (e.g., a streamlined search that can be fulfilled using data dictionary 410 faster than traversing the feature graph 300, for example).

FIG. 5 illustrates a flowchart of an example method 500 for providing search results comprising features of a feature graph database that are labeled with a first community label in response to a search associated with at least one of the features, according to the present disclosure. In one example, the method 500 is performed by a component of the system 100 of FIG. 1, such as by server(s) 135, and/or any one or more components thereof (e.g., a processor, or processors, performing operations stored in and loaded from a memory or distributed memory system), or by server(s) 135, in conjunction with one or more other devices, such as DB(s) 136, server(s) 155, and so forth. In one example, the steps, functions, or operations of method 500 may be performed by a computing device or processing system, such as computing system 600 and/or a hardware processor element 602 as described in connection with FIG. 6 below. For instance, the computing system 600 may represent at least a portion of a platform, a server, a system, and so forth, in accordance with the present disclosure. In one example, the steps, functions, or operations of method 500 may be performed by a processing system comprising a plurality of such computing devices as represented by the computing system 600. For illustrative purposes, the method 500 is described in greater detail below in connection with an example performed by a processing system (e.g., deployed in a telecommunication network). The method 500 begins in step 505 and proceeds to step 510.

At step 510, the processing system applies a community detection process to a feature graph database to identify a plurality of communities of features within the feature graph database. For instance, the feature graph database (or "feature graph") may comprise: a plurality of objects, each of the plurality of objects associated with one of a feature or a concept, and a plurality of relationships (or edges) between the plurality of objects. In one example, the community detection process may be applied with respect to feature-to-feature relationships in the feature graph (e.g., and excluding feature-to-concept, concept-to-concept, or other relationships). As noted above, the feature-to-feature relationships may exist in the feature graph in accordance with one or more feature ontologies (and the ontology of the feature graph as a whole), in accordance with lineage information that may indicate non-ontological relationships among features, and/or in accordance with non-ontological relationships that may be determined via fingerprint matching or the like. As such, in one example, at least a first portion of the plurality of feature-to-feature relationships is obtained from one or more users. In addition, in one example, at least a second portion of the plurality of feature-to-feature relationships may be identified via at least one of: an ontological verification process and/or a fingerprint/feature profile verification process. For instance, an ontological verification process and/or fingerprinting process performed when checking for duplicate features during a feature on-boarding process may identify that two (or more) features may be of a same type, but may be non-overlapping or only partially overlapping with respect to time, geography, or one or more other aspects.

In one example, each of the feature-to-feature relationships may be of one of plurality of feature-to-feature relationship types, such as: a related-to relationship type, a subset-of-relationship type, a derived-from relationship type, a same-as-but-disjoint-from relationship type, a partially-overlapping relationship type, or the like. In one example, the community detection may comprise, for example, a label propagation community detection process, a hierarchical clustering community detection process, an eigenvector-based community detection process, a clique-based community detection process, etc., such as a Louvain community detection process, a Leiden community detection process, etc., a walktrap community detection process, a spinglass community detection process, and so forth. In one example, the community detection may comprise a connected components process, such as a breadth-first search, a depth-first search, a union find, a distributed parallel union find, a Tarjan's algorithm, or Kosaraju's algorithm, or the like. In one example, the connected components process may comprise a weak connected components process to find "weak connected components." However, in another example, the connected components process may comprise a strong connected components process to find "strong connected components." In any case, the result is a plurality of feature communities (e.g., connected components) each comprising one or more features.

At optional step 520, the processing system may verify the plurality of communities (e.g., confirm the accuracy of the result), such as in accordance with a node similarity metric. For instance, optional step 520 may comprise calculating a Jaccard measure, performing node vector embedding and then taking an average of the distances between nodes in the community (e.g., a cosine distance or the like), and so forth. When the measure satisfies a threshold (e.g., the similarity measure exceeds the threshold, the distance metric is less than the threshold, etc.), a community may be verified as accurate, and so forth for other communities.

At optional step 530, the processing system may assign at least a first community label to the least a first community of the plurality of communities. For instance, the processing system may assign community labels (such as group IDs illustrated in FIG. 4) based on the order of finalization of communities via community detection at step 520. In another example, each feature may be assigned a unique and sequential feature ID when added to the feature graph database. In one example, a community label may then be assigned to a community/group by selecting a largest numeric feature ID in a group and adding a digit signifying group ID, such as appending a "9" as the most significant digit, or the like. In one example, a community label may alternatively or additionally include a community name. For instance, for a given feature community, the community label may be selected as a feature label for a first feature of the feature community that was the earliest added to the feature graph database from among the features of the particular feature community (and so on for other feature communities).

At step 540, the processing system labels a first plurality of features of the feature graph database with at least a first community label, where the first plurality of features comprises features of at least a first community of the plurality of communities. In one example, step 540 may also include labeling other features of the feature graph database with other community labels (e.g., for all communities that may be identified at step 510). In one example, the labeling may include adding the first community label to nodes/objects associated with the first plurality of features within the feature graph database. Alternatively, or in addition, the labeling may include adding the first community label to entries associated with the first plurality of features within a data dictionary associated with the feature graph database (such as data dictionary 410 of FIG. 4). In one example, optional step 530 and/or step 540 may be performed in response to the communities being verified at optional step 520.

At step 550, the processing system obtains a search associated with at least one feature of the feature graph database (e.g., where the at least one feature is a part of the at least the first plurality of features of the at least the first community). For instance, the search may be over the feature graph database (e.g., an ontological search) and/or may be over a data dictionary associated with the feature graph database (e.g., a streamlined search that can be fulfilled using data dictionary faster than traversing the feature graph database, for example). To illustrate, a user may enter search terms such as "fraud" and "phone X" (e.g., an ontological search). Alternatively, or in addition, a user may enter a search such as "feature community of IMEI" or "related features of IMEI," e.g., where such a search may be performed over the feature graph database, but which may more efficiently be fulfilled via a search over the data dictionary. In yet another example, a user may specifically query for a feature community of a feature, responsive to which the feature community may similarly be obtained as a direct result from the data dictionary.

At step 560, the processing system provides the first plurality of features in response to the search. In one example, step 560 may comprise providing a list of the first plurality of features. In one example, step 560 may comprise providing a visualization of a sub-graph of the feature graph database, where the sub-graph comprises the first plurality of features. For instance, the results may include a visualization, such as the illustration of one or more of the feature communities 420 of FIG. 4. It should again be noted that feature community information (e.g., a feature community to which a feature belongs and/or the members of a feature community) may be provided as additional information responsive to a search associated with one or more features (e.g., in addition to identifying the at least one feature that may be responsive to the search query). For instance, a user may enter search terms such as "fraud" and "phone X," and the processing system may identify and provide multiple features related to these terms at step 560 in response to the search. However, in accordance with the present disclosure, the results provided at step 560 may further include feature community information for one or more of such features.

Following step 560, the method 500 proceeds to step 595 where the method 500 ends.

It should be noted that the method 500 may be expanded to include additional steps, or may be modified to replace steps with different steps, to combine steps, to omit steps, to perform steps in a different order, and so forth. For instance, in one example the processing system may repeat one or more steps of the method 500, such as steps 510-540 or steps 510-560 for subsequent time periods (e.g., updating feature communities daily, weekly, etc. and/or receiving and responding to additional search requests during such subsequent time periods). For instance, as noted above, the community detection process may be applied on a periodic basis, e.g., daily, weekly, etc. and/or in response to an addition of at least one of: a threshold number of features or a threshold number of data sets to the feature graph database. In one example, the method 500 may include obtaining a user selection of one or more features (e.g., from among the results provided at step 560). For instance, a user may select one or more of these features (e.g., column or columns), may select a time range or time ranges for which the feature(s) (e.g., column(s)) is/are desired, may request download the underlying data records from the feature store, may join to data that is possessed/stored locally, and so forth. Accordingly, in one example the method 500 may further include providing such addition information responsive to such request. In still another example, feature community information may not be provided at step 560, but may be provided upon request, e.g., in response to a user selection of one or more features from among the results presented at step 560 for which the user desires more information (e.g., including at least the feature community information). In one example, the method 500 may include adding features (and relationships) to a feature graph database, such as illustrated and described in connection with the examples of FIGS. 2 and 3. In one example, optional step 520 may include requesting an authorized user to confirm any feature communities for which a matching score failed to meet a threshold (and/or to identify any feature-to-feature relationships that may appear to be incorrect, etc.). In one example, the method 500 may be expanded or modified to include steps, functions, and/or operations, or other features described above in connection with the example(s) of FIGS. 1-4, or as described elsewhere herein. Thus, these and other modifications are all contemplated within the scope of the present disclosure.

In addition, although not expressly specified above, one or more steps of the method 500 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 5 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

Figure 6:
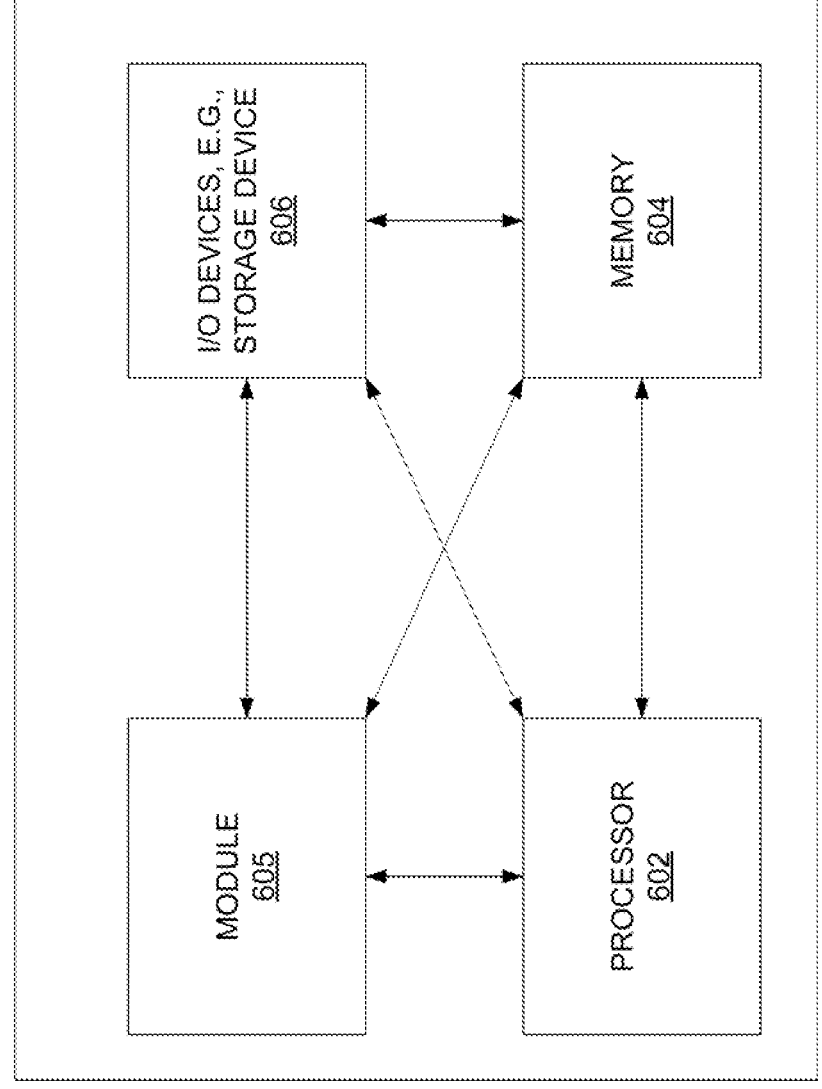
FIG. 6 illustrates a high-level block diagram of a computing device specially programmed to perform the functions described herein.

FIG. 6 depicts a high-level block diagram of a computing system 600 (e.g., a computing device or processing system) specifically programmed to perform the functions described herein. For example, any one or more components, devices, and/or systems illustrated in FIG. 1, or described in connection with FIGS. 2-5, may be implemented as the computing system 600. As depicted in FIG. 6, the computing system 600 comprises a hardware processor element 602 (e.g., comprising one or more hardware processors, which may include one or more microprocessor(s), one or more central processing units (CPUs), and/or the like, where the hardware processor element 602 may also represent one example of a "processing system" as referred to herein), a memory 604, (e.g., random access memory (RAM), read only memory (ROM), a disk drive, an optical drive, a magnetic drive, and/or a Universal Serial Bus (USB) drive), a module 605 for providing search results comprising features of a feature graph database that are labeled with a first community label in response to a search associated with at least one of the features, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 602 is shown, the computing system 600 may employ a plurality of hardware processor elements. Furthermore, although only one computing device is shown in FIG. 6, if the method(s) as discussed above is implemented in a distributed or parallel manner for a particular illustrative example, e.g., the steps of the above method(s) or the entire method(s) are implemented across multiple or parallel computing devices, then the computing system 600 of FIG. 6 may represent each of those multiple or parallel computing devices. Furthermore, one or more hardware processor elements (e.g., hardware processor element 602) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 602 can also be configured or programmed to cause other devices to perform one or more operations as discussed above. In other words, the hardware processor element 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 605 for providing search results comprising features of a feature graph database that are labeled with a first community label in response to a search associated with at least one of the features (e.g., a software program comprising computer-executable instructions) can be loaded into memory 604 and executed by hardware processor element 602 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 602) executing the computer-readable instructions relating to the above described method(s) can be perceived as a programmed processor or a specialized processor. As such, the present module 605 for providing search results comprising features of a feature graph database that are labeled with a first community label in response to a search associated with at least one of the features (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server. While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
applying, by a processing system including at least one processor, a community detection process to a feature graph database representing one or more data tables of telecommunication network operational data to identify a plurality of communities of features within the feature graph database, where each of the one or more data tables comprises a plurality of rows and a plurality of columns, wherein the feature graph database comprises:
    a plurality of objects, each of the plurality of objects representing a feature of a plurality of features, wherein each of the plurality of features comprises a column of the one or more data tables, the column comprising a vector of values of a particular data type; and
    a plurality of relationships between the plurality of objects, wherein the community detection process is applied only with respect to a plurality of feature-to-feature relationships of the plurality of relationships within the feature graph database, wherein each of the plurality of feature-to-feature relationships represents a column-to-column relationship between respective columns of the one or more data tables;
labeling, by the processing system, a first plurality of features of the feature graph database with at least a first community label, wherein the first plurality of features comprises features of at least a first community of the plurality of communities;
obtaining, by the processing system, a search associated with at least one feature of the feature graph database, wherein the at least one feature is a part of the at least the first plurality of features of the at least the first community; and
providing, by the processing system, the first plurality of features in response to the search for detecting duplicate features.

2. The method of claim 1, wherein at least a first portion of the plurality of feature-to-feature relationships is obtained from one or more users.

3. The method of claim 2, wherein at least a second portion of the plurality of feature-to-feature relationships is identified via at least one of: an ontological verification process or a fingerprint verification process.

4. The method of claim 1, wherein each of the feature-to-feature relationships is one of a plurality of feature-to-feature relationship types.

5. The method 4, wherein the plurality of feature-to-feature relationship types includes at least one of:
    a related-to relationship type;
    a subset-of-relationship type;
    a derived-from relationship type;
    a same-as-but-disjoint-from relationship type; or
    a partially-overlapping relationship type.

6. The method of claim 1, wherein the labeling includes labeling a plurality of entries in a data dictionary associated with the feature graph database with the at least the first community label, wherein the plurality of entries is associated with the first plurality of features.

7. The method of claim 6, wherein the search is over the data dictionary.

8. The method of claim 1, wherein the providing comprises providing a list of the first plurality of features.

9. The method of claim 1, wherein the providing comprises providing a visualization of a sub-graph of the feature graph database, where the sub-graph comprises the first plurality of features.

10. The method of claim 1, further comprising:

assigning the at least the first community label to the least the first community of the plurality of communities.

11. The method of claim 1, wherein the community detection process is applied on a periodic basis.

12. The method of claim 1, wherein the community detection process is applied in response to an addition of at least one of: a threshold number of features or a threshold number of data sets to the feature graph database.

13. The method of claim 1, wherein the community detection process comprises a connected components process.

14. The method of claim 13, wherein the connected components process comprises:

a breadth-first search;

a depth-first search;

a union find; or a distributed parallel union find.

15. The method of claim 1, wherein the community detection process comprises:

a label propagation community detection process;

a hierarchical clustering community detection process;

an eigenvector-based community detection process; or a clique-based community detection process.

16. The method of claim 1, further comprising:

verifying the plurality of communities in accordance with a node similarity metric.

17. The method of claim 16, wherein the node similarity metric comprises:

a Jaccard measure; or a vector embedding distance measure.

18. A non-transitory computer-readable medium storing instructions which, when executed by a processing system including at least one processor, cause the processing system to perform operations, the operations comprising:

applying a community detection process to a feature graph database representing one or more data tables of telecommunication network operational data to identify a plurality of communities of features within the feature graph database, where each of the one or more data tables comprises a plurality of rows and a plurality of columns, wherein the feature graph database comprises:

a plurality of objects, each of the plurality of objects representing a feature of a plurality of features, wherein each of the plurality of features comprises a column of the one or more data tables, the column comprising a vector of values of a particular data type; and a plurality of relationships between the plurality of objects, wherein the community detection process is applied only with respect to a plurality of feature-to-feature relationships of the plurality of relationships within the feature graph database, wherein each of the plurality of feature-to-feature relationships represents a column-to-column relationship between respective columns of the one or more data tables;

labeling a first plurality of features of the feature graph database with at least a first community label, wherein the first plurality of features comprises features of at least a first community of the plurality of communities;

obtaining a search associated with at least one feature of the feature graph database, wherein the at least one feature is a part of the at least the first plurality of features of the at least the first community; and providing the first plurality of features in response to the search for detecting duplicate features.

19. A device comprising:

a processor system including at least one processor; and a computer-readable medium storing instructions which, when executed by the processing system, cause the processing system to perform operations, the operations comprising:

applying a community detection process to a feature graph database representing one or more data tables of telecommunication network operational data to identify a plurality of communities of features within the feature graph database, where each of the one or more data tables comprises a plurality of rows and a plurality of columns, wherein the feature graph database comprises:

a plurality of objects, each of the plurality of objects representing a feature of a plurality of features, wherein each of the plurality of features comprises a column of the one or more data tables, the column comprising a vector of values of a particular data type; and a plurality of relationships between the plurality of objects, wherein the community detection process is applied only with respect to a plurality of feature-to-feature relationships of the plurality of relationships within the feature graph database, wherein each of the plurality of feature-to-feature relationships represents a column-to-column relationship between respective columns of the one or more data tables;

labeling a first plurality of features of the feature graph database with at least a first community label, wherein the first plurality of features comprises features of at least a first community of the plurality of communities;

obtaining a search associated with at least one feature of the feature graph database, wherein the at least one feature is a part of the at least the first plurality of features of the at least the first community; and providing the first plurality of features in response to the search for detecting duplicate features.

20. The device of claim 19, wherein at least a first portion of the plurality of feature-to-feature relationships is obtained from one or more users.

* * * * *